April 9, 1957  J. D. CHRISTIAN  2,788,249
BEARING SUPPORT AND SEAL FOR SHAFT
Filed June 18, 1953  3 Sheets-Sheet 1

INVENTOR.
Joseph D. Christian
ECKHOFF & SLICK
ATTORNEYS
BY
A MEMBER OF THE FIRM

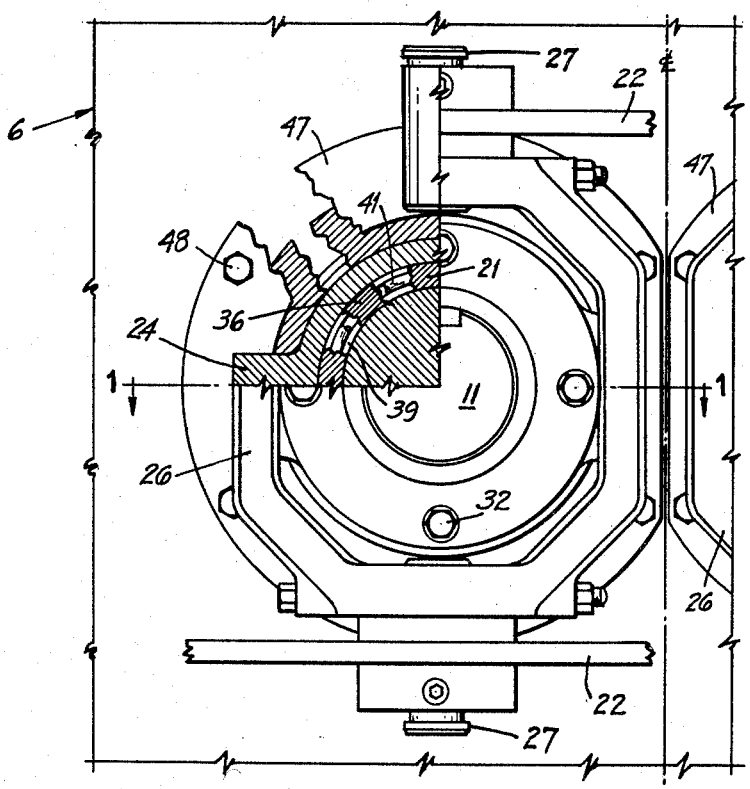
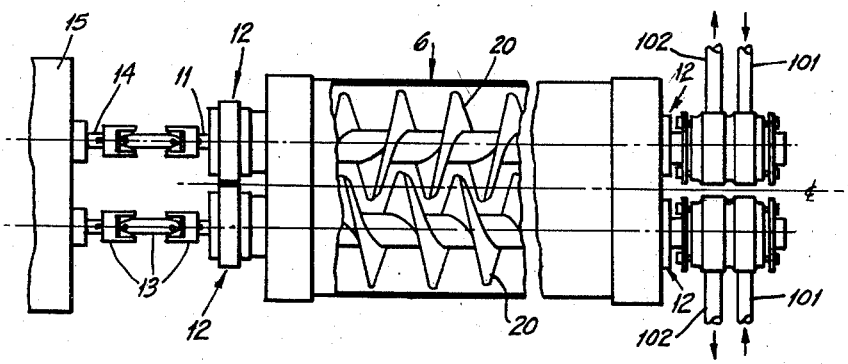

United States Patent Office 2,788,249
Patented Apr. 9, 1957

2,788,249

BEARING SUPPORT AND SEAL FOR SHAFT

Joseph D. Christian, San Francisco, Calif.

Application June 18, 1953, Serial No. 362,601

7 Claims. (Cl. 308—36.1)

This invention relates to a bearing mounting and a seal for a shaft which rotates about a path of an irregular shape and size.

In my prior patent, No. 321,185, I have disclosed the utility of a screw conveyor wherein the conveyor flight is hollow, and a fluid is passed through the hollow flight in heat exchange relation to a material in contact with the screw conveyor flight. In my copending application, Serial No. 330,397, filed January 9, 1953, now abandoned, I have disclosed the utility and advantage of employing two or more screw conveyor flights of which at least one flight is hollow and the flights rotate in opposite directions and in an overlapping relation. In operation, it has been observed that each such screw conveyor flight will flex and bend during rotation with the result that the effectiveness and the life of the seals and the bearings provided at the ends of the flights was not satisfactory. In accordance with this invention, I provide a novel seal and bearing support structure, one which enables the conveyor shaft to follow its own inclination with respect to rotation, and yet which provides adequate rotational support for the shaft and an adequate seal about the shaft.

It is in general the broad object of the present invention to provide an improved seal and bearing support for a shaft rotatable about a path of the irregular size and shape.

The invention includes other objects and features of advantage, some of which, together with the foregoing, will appear hereinafter wherein the present preferred form of shaft seal and shaft support are disclosed. In the drawing accompanying and forming a part hereof, Figure 1 is a side elevation partly in section along the line 1—1 in Figure 4, taken through a seal and bearing support embodying this invention.

Figure 4 is an end view of the structure shown in Figure 1, portions being broken away.

Figure 5 is a schematic view illustrating the general details of the drive set-up.

Figure 1:
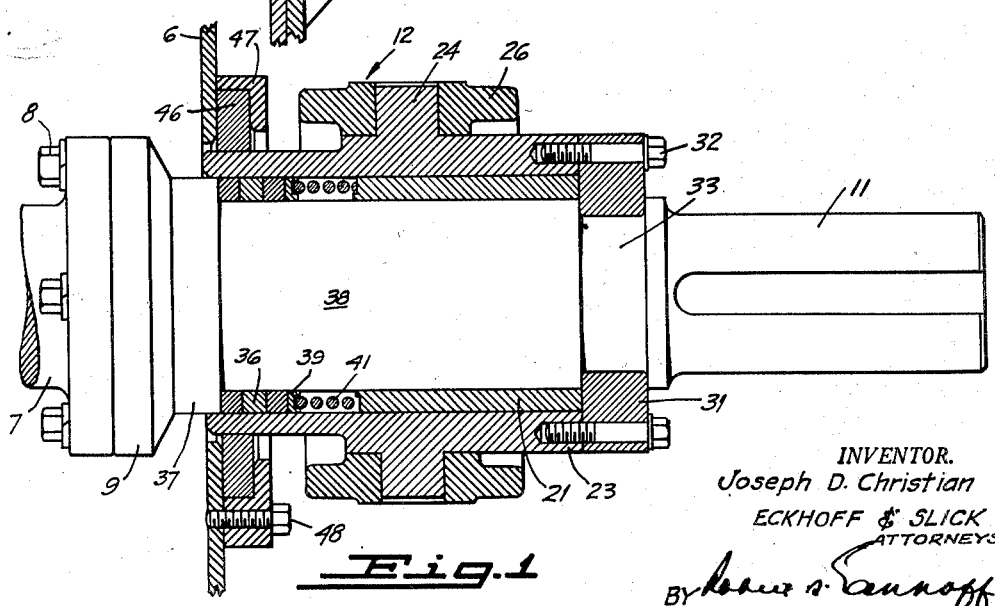

Referring to the drawings and particularly to Figures 1, 4 and 5, I have shown a suitable casing 6 in which are mounted one or more screw conveyor flights, these being each formed upon a support 7, the end of which is joined by several bolts 8, to a flange 9 on a stub shaft 11. The stub shaft 11 is supported in the presently described bearing structure, generally indicated at 12, and a universal joint 13 which connects the shaft 11 to a shaft 14 extending from suitable drive means, generally indicated at 15. In Figure 5, I have shown two interleaved flights 20 and their associated supports and drives; more interleaved flights can be provided, as is set forth in my copending application, Serial No. 330,397, filed January 9, 1953. Adjacent flights rotate counter-directionally, while at least one of the flights is supplied with a heat exchange fluid through feed pipe 101 and drain 102.

In use, the axis of rotation of the conveyor support 7 and the stub shaft 11 will not coincide at all times with the position of their common axis at rest; the end of stub shaft 11, for example, will describe a path of an irregular size and shape during its rotation; further, the end of stub shaft 11 may move over a path which varies during each 360° of rotation. The universal joint 13, however, accommodates for the drive and enables a drive shaft 14 to drive its associated stub-shaft even though shaft 14 rotates about its own longitudinal axis as its only axis of rotation, while the end of shaft 11 moves simultaneously over a path of irregular shape and size.

To provide for support of the stub shaft 11 during its rotation, a bearing 21 is provided about the shaft and is secured within a bearing housing 23. The bearing housing 23 is mounted by integral gimbal pins 24 in yoke 26, the latter in turn being mounted by gimbal bearing pins 27 carried in spaced brackets 22 on the casing 6. To care for any thrust applied from the conveyor flight on the stub shaft, a split collar thrust bearing 31 is secured on the end of bearing housing 23 by bolts 32, the split collar thrust bearing fitting a reduced portion 33 of the shaft 11.

To seal bearing 21 against contact with material handled by the conveyor, several packing elements, generally indicated at 36, which engage against the annular surface of a flange 37 on shaft 11, which surface faces outwardly of the casing, fit snugly within bearing housing 23, and surround a reduced portion 38 on shaft 11. A retainer ring 39 is provided within the bearing housing 23 in abutment with the packing, a spring 41 being provided between the end of bearing 21 and the retainer ring 39 so that the packing is maintained compressed at all times.

To prevent egress of material from the casing 6, as such, a resilient seal ring 46 is provided about the exterior of bearing housing 23, and is retained in place by a seal ring housing 47, the latter being secured by capscrews 48. The ring 46 closes a gap which is provided between the casing and the flight mounting means consisting of the shaft 7 and its attachments and bearing means. The gap permits movements of said mounting means due to the flexing of the flight.

From the foregoing, I believe it will be apparent that stub shaft 11 can rotate about what I term a haphazard axis, yet is amply supported at all times for such rotation in a bearing which is sealed against contact with the material handled. At the same time, haphazard rotation of the stub shaft 11 is isolated by the universal drive connection 13 so that such haphazard rotation does not affect the operation of the drive means 15.

Figure 2:
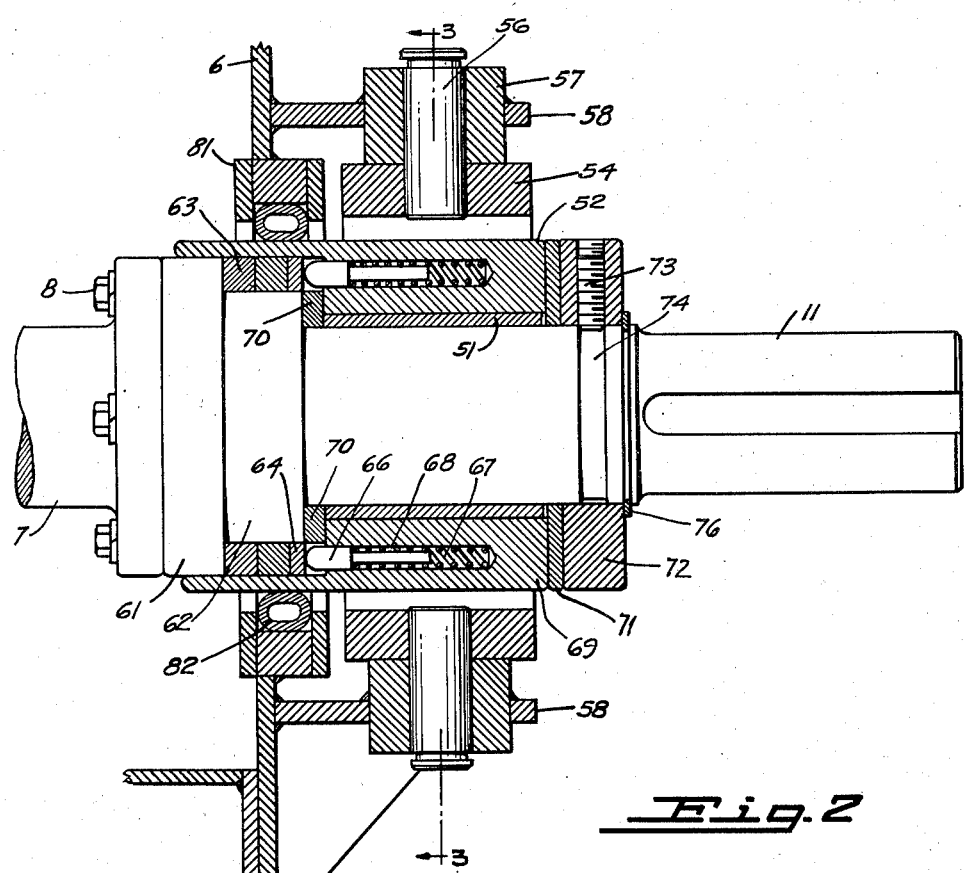
Figure 2 is a side elevation, partly in section, being a modified form of seal and bearing.
Figure 3:
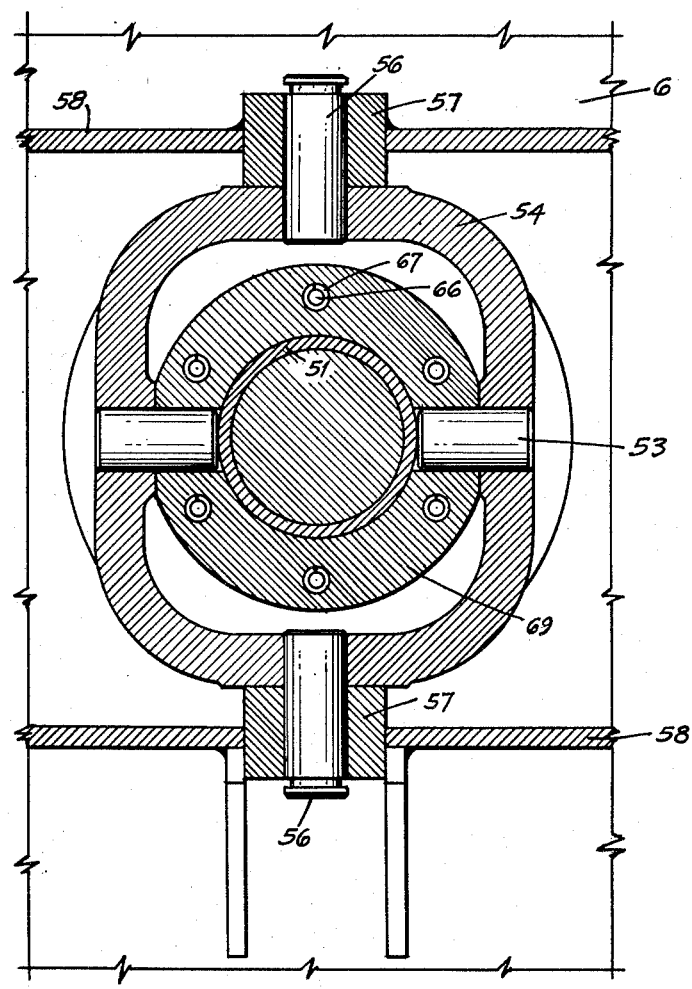
Figure 3 is an end elevation partly in section of the structure shown in Figure 2.

In that form of device shown in Figures 2 and 3, stub shaft 11 is joined by bolts 8 to the flanged end of the screw conveyor shaft 7. A bearing 51 is provided within a gimbal bearing housing 52, the latter being mounted by pins 53 in yoke 54. Yoke 54 is in turn mounted by pins 56, the latter being at right angles to pins 53. Pins 56 are respectively supported on vertically spaced bearings 57, mounted in brackets 58 provided upon casing 6.

One end of stub shaft 11 includes annular flanges 61 and 62 thereon, flange 61 fitting snugly within a portion of enlarged internal radius of bearing housing 52. Several rings of a suitable packing material, indicated at 63, are provided within the bearing housing 52 and between a compressor ring 64 and the face of flange 61, the packing extending about flange 62. The compressor ring is urged to retain the packing in the compressed state by a plurality of plungers 66 urged by springs 67, the plungers and springs being mounted in suitable cavities 68 in an enlarged portion 69 of the bearing housing 52. A thrust bearing washer 70 is provided between the face of flange 62, bearing 51 and the face of enlarged portion 69. Another thrust bearing 71 is provided between the outer face of bearing housing 52 and a thrust ring 72 mounted upon stub shaft 11 and retained in place by a set screw 73 extending into engagement with a groove 74 in the stub shaft 11. A retainer snap ring 76 also serves to maintain the thrust collar 72 in position.

To seal the casing against material egress, an annular channel, generally indicated at 81, is provided in the casing 6 about the outer periphery of the bearing housing 52 and a resilient tubular seal, generally indicated at 82, is provided between the annular channel and the exterior of the bearing housing 52. In this form of the device, the stub shaft is also supported for rotation about a haphazard axis, while the bearing supporting the stub shaft for rotation is sealed from contact with the material handled.

I claim:

1. In a conveyor apparatus, a bearing support and seal for a stub shaft comprising a casing having a wall, a stub shaft extending through said wall for connection with a screw conveyor flight, a bearing for said stub shaft, a housing for said bearing, a gimbal mounting on the casing wall and supporting said bearing and housing, first sealing means mounted on the stub shaft between the bearing and a flange on the stub shaft, and a second sealing means between the bearing housing and the casing.

2. A device as set forth in claim 1, wherein the bearing housing is secured within the gimbal mounting, a second gimbal mounting for the first mentioned gimbal mounting, and brackets attached to the casing and supporting said second gimbal mounting.

3. A device as set forth in claim 2, including a collar thrust bearing secured to one end of the bearing housing secured within the first gimbal mounting and fitting a reduced portion of the stub shaft.

4. A device as set forth in claim 1, wherein the first sealing means comprise packing elements in engagement with an annular surface of the flange of the stub shaft, said flange fitting snugly with the bearing housing secured within the first gimbal mounting, and spring means between one end of the bearing and the packing elements.

5. A device as set forth in claim 4, wherein the second sealing means comprise a resilient seal ring about the exterior of the bearing housing, and a housing for retaining said seal ring in secured position to the casing.

6. A device as set forth in claim 1, wherein the stub shaft is provided with two annular flanges, one flange fitting snugly within an enlarged portion of the bearing housing secured within the first gimbal mounting, while the second flange receives the first sealing means and engaging the face of the first mentioned flange.

7. A device as set forth in claim 6, wherein the second sealing means comprises an annular channel mounted within the casing about the outer periphery of the bearing housing and a resilient tubular seal member located within the annular channel and tightly engaging the exterior of the bearing housing.

References Cited in the file of this patent

UNITED STATES PATENTS

| | | |
|---|---|---|
| 2,096,597 | Seabrooks | Oct. 19, 1937 |
| 2,113,335 | Wallgren | Apr. 5, 1938 |
| 2,165,916 | Bissell | July 11, 1939 |
| 2,233,557 | Shager | Mar. 4, 1941 |
| 2,430,752 | Yager | Nov. 11, 1947 |
| 2,636,284 | Napier | Apr. 28, 1953 |